United States Patent [19]

Bocci et al.

[11] Patent Number: 4,710,957
[45] Date of Patent: Dec. 1, 1987

[54] DATA DETECTION BY STATISTICAL ANALYSIS

[75] Inventors: Paul M. Bocci, Roselle; Carl M. Pietrzak, Jr., Schaumburg; Alan L. Wilson, Hoffman Estates, all of Ill.

[73] Assignee: Motorola, Inc., Schaumburg, Ill.

[21] Appl. No.: 858,461

[22] Filed: Apr. 30, 1986

[51] Int. Cl.⁴ .............................................. H04K 1/02
[52] U.S. Cl. ......................................... 380/42; 375/94
[58] Field of Search ............... 375/76, 94; 329/104; 455/135; 364/554; 371/6; 380/37, 42, 46

[56] References Cited

U.S. PATENT DOCUMENTS 3,667,057  5/1972  Pfersch et al. .................... 328/156
3,995,225  11/1976 Horn ................................. 329/106
4,174,502  11/1979 Wilson et al. ..................... 329/104
4,197,502  4/1980  Sumner et al. ..................... 375/75
4,596,024  6/1986  Thomson ............................ 375/100

Primary Examiner—Robert L. Griffin
Assistant Examiner—James E. Busch
Attorney, Agent, or Firm—Thomas G. Berry

[57] ABSTRACT

A data detector is disclosed wherein a received signal is analyzed to determine its statistical characteristics. These characteristics are compared to a predetermined statistical distribution. If the signal is statistically close to the statistical characteristics of a known signal a detect signal is generated and the received signal is passed for further processing and reception.

6 Claims, 7 Drawing Figures

DATA DETECTION BY STATISTICAL ANALYSIS

TECHNICAL FIELD

This invention relates generally to data detectors and is more particularly directed toward a method and apparatus for detecting a predetermined type of digital signal via statistical analysis.

BACKGROUND ART

Those skilled in the art will appreciate that data detectors find wide application in modern receivers. Historically, data detectors have utilized various techniques which focus on the fact that the bit transitions of a recevied digital signal occur in a predictable relationship with respect to one another. Typically, such data detectors look for a bit transition (i.e., the transition from a logic "1" state to a logical "0" state or vise versa) occuring during some predetermined "window", which varies depending upon whether the preceeding bit transition was from one-to-zero or zero-to-one. These detectors generally suffer a detriment in that they are prone to "falsing" (i.e., incorrectly determining the presence or absence of a proper data signal).

SUMMARY OF THE INVENTION

Accordingly, it is an object of the present invention to provide an improved data detector.

It is another object of the present invention to provide a data detector that overcomes the deficiencies of the prior art.

It is a further object of the present invention to provide a data detector that bases signal detection upon a statistical analysis of the received signal.

Briefly, according to the invention, a received signal is analyzed to determine its statistical characteristics. These characteristics are compared to a predetermined statistical distribution. If the signal is statistically close to the statistical characteristics of a known signal a detect signal is generated and the received signal is passed for further processing and reception.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures in which like referenced numerals identify like elements, and in which:

DETAILED DESCRIPTION OF THE PREFERRED EMBODIMENT

Figure 1A:
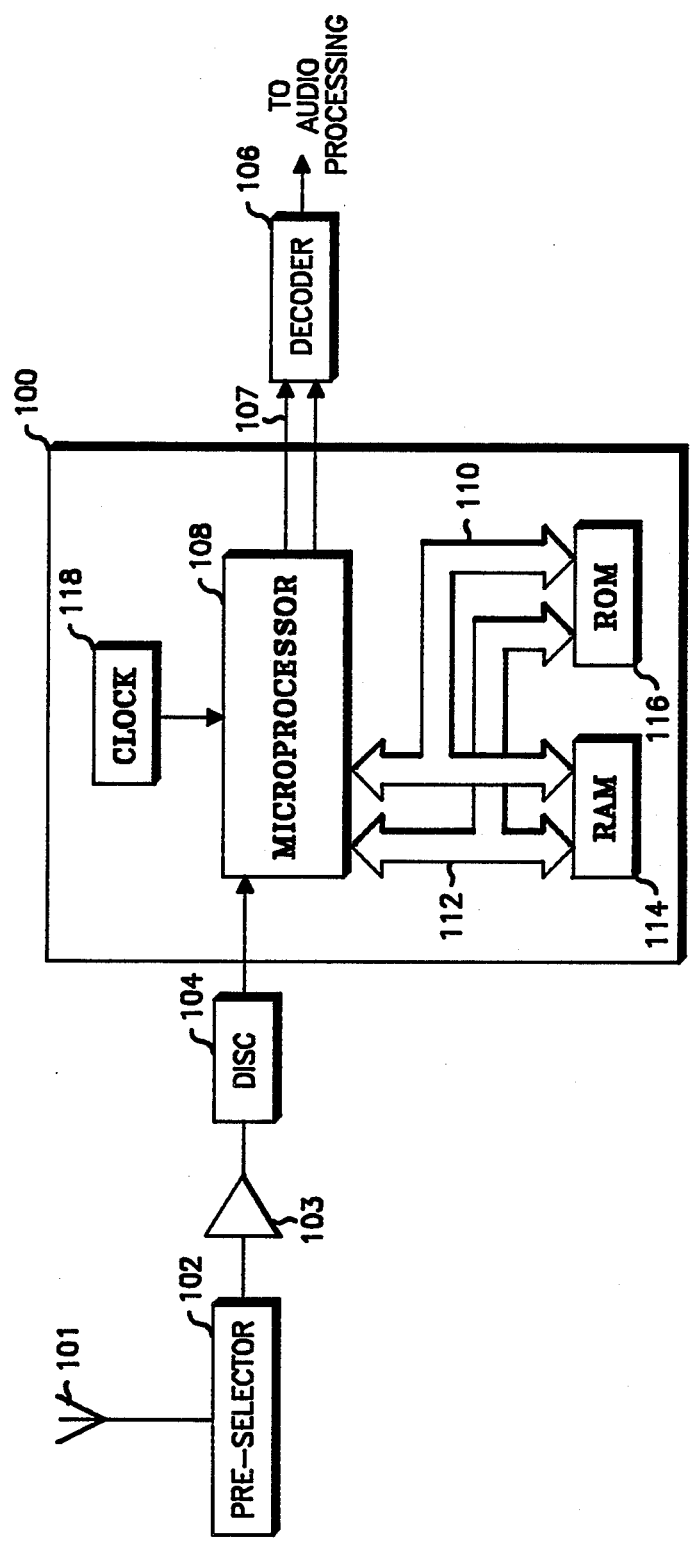
FIG. 1a is a block diagram of the data detector of the present invention employed in a receiver.
Figure 1B:
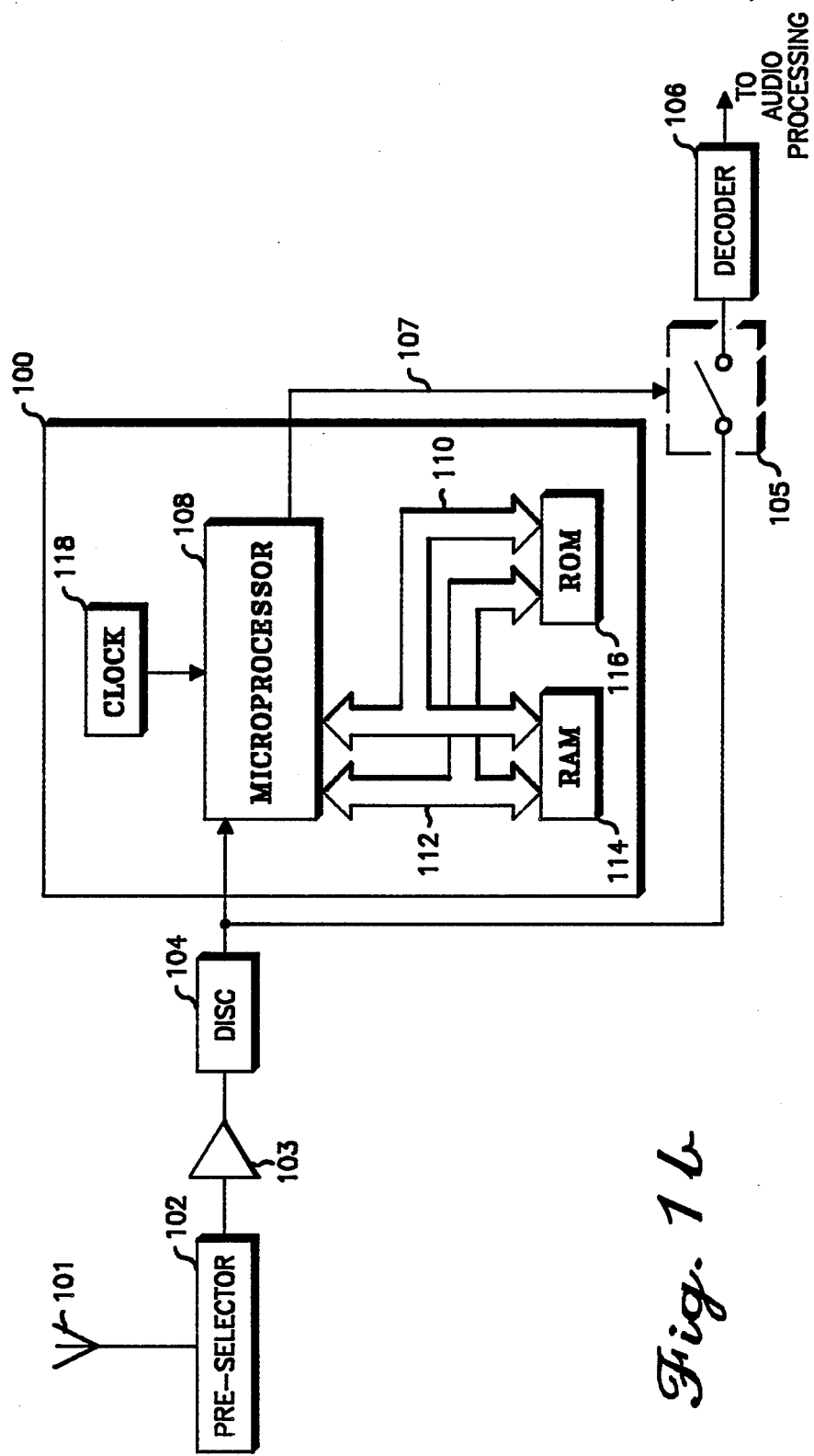
FIG. 1b is a block diagram of the data detector of the present invention alternately employed in a receiver.

Referring now to the drawings, and in particular to FIGS. 1a and 1b, there is shown the data detector 100 of the present invention alternately employed in two unmatched receivers. As used herein, an unmatched receiver means those receivers having a filter response different than (i.e., unmatched to) the response of the desired signal. Operationally, a transmitted digital signal is received by an antenna 101, which couples the signal to an unmatched filter 102. The band-limited signal is routed to an amplifier 103, which passes the appropriately amplfied signal to a discriminator 104. The present invention contemplates the discriminator 104 to include a clock recovery means to provide re-clocked data to the detector 100. Alternately, of course, a separate clock recovery circuit may be used. The detector 100 statistically analyzes the received digital signal to determine if it is sufficiently close to the statistics of a known signal. An affirmative determination results in the assertion of a detect signal 107, which may be routed to various subsequent circuits for control purposes or the like.

Referring either to FIG. 1a or 1b, the detector 100 receives a digital signal (which comprises recovered re-clocked data) from the discriminator 104 using, preferably, a microprocessor 108. The microprocessor 108 communicates via an address bus 110 and a data bus 112 with a random-access-memory (RAM) 114, and a read-only-memory (ROM) 116, which may store the operational commands (i.e., the program) of the microprocessor 108. Preferably, the received signals are stored in the RAM 114 and segments thereof removed for statistical evaluation based upon the statistical characteristics of a "good" signal (which may be stored in the ROM 116). Alternately, if the length of the digital signals is appropriately short, the entire message may be evaluated at once. Moreover, those skilled in the art will appreciate that if the clock 118, the RAM 114 and the ROM 116 resided internal to the microprocessor 108, the selector 104 may be embodied as a single device.

In FIG. 1a, the received digital signal is routed from the detector 100 to a decoder 106 together with the detect signal 107. The decoder 106 may be simply a digital-to-analog (D/A) converter, or, in a secure system, the decoder 106 may comprise a suitable decryption device depending upon the particluar crypoalgoritum used. The decoded (analog) selected signal may be passed from the decoder 106 to any suitable audio processing circuits for reception.

The receiver of FIG. 1b, includes a switch 105 (or functional equivalent) that receives the received digital signal from the discriminator 104. If the detector 100 determines that the received signal is statistically close to the known signal, the detect signal 107 closes the switch 105 allowing the signal to pass to the decoder 106.

In a secure communication system, an information signal is operated upon to produce an encrypted signal that is unintelligible to any unauthorized receiver. Typically, the encrypted signal resembles a random distribution of logical 1's and 0's. Those skilled in the art will appreciate that such a process may be modeled as a series of independant Bernoullli trials. For each Bernoulli trial, the probability P of a one equals the probability of a zero. Therefore, $P(1) = P(0) = \frac{1}{2}$ (or 0.5).

This series of Bernoulli trials together comprise a Binomial distribution of ones and zeroes. A Binomial distribution will have an expected value E given by:

$$E(K) = N*P \qquad (1)$$

where,

K is the number of times the desired type of bit (or bit pattern) was received;

N is the number of bits (or bit patterns) received; and

P is the probability that any given bit (or bit pattern) is of the desired type.

Given P=0.5, equation (1) becomes:

$$E(K) = N/2 \qquad (2)$$

Thus, in a process having this Binomial distribution, the expected number of logical 1's and 0's is one-half the sample size N. Accordingly, in an uncorrupted or noise-free encrypted signal, there should be an even distribution of received logical 1's and 0's. A signal that deviates from this distribution may either be a corrupted (noisy) encrypted signal or some other signal that is not ecrypted.

Those skilled in the art will appreciate, that in any real embodiment, a receiver receiving a noise signal not produce a random distribution of logical 1's and 0's, but they will not be mutually independent. By band-limiting the noise signal (such as by filtering) a receiver modifies the ideal response such that the received signal becomes distinguishable from a noise-free Binomially distributed signal. The statistical interdependency of the bits is skewed by noise and becomes measureable by counting the occurrence of predetermined bit patterns. In this way, the present invention may determine whether a received signal is a particular signal.

Figure 2:
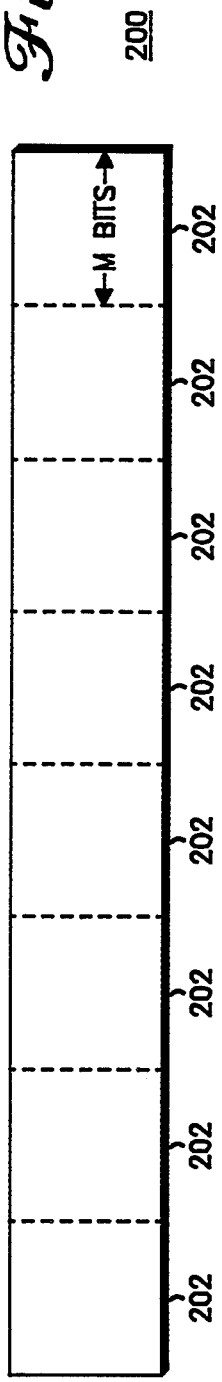
FIG. 2 is an illustration of the preferred method of segmenting a digital signal received in the receivers of FIGS. 1a or 1b.

If a received message is appropriately short, it may be stored and analyzed at one time on a bit-by-bit basis. In practice, this may take excessive time. Accordingly, the present invention contemplates segmenting the stored signal and evaluating the segments using groups of the received bits. Referring now to FIG. 2, an illustration of the preferred segmentation method is shown. The information signal 200 is parsed into segments 202 each having M bits. In the preferred embodiment of the present invention, M (the length of the segments 202) is selected for convenience to be 8192 bits (i.e., 1024 bytes).

Figure 3A:
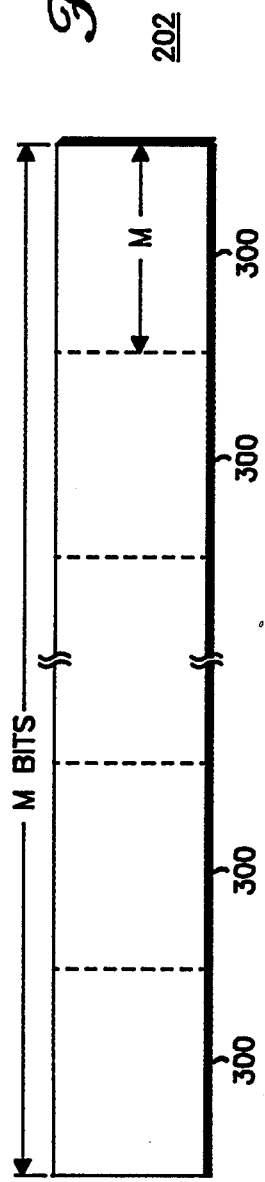
FIGS. 3a–3c are illustrations of the preferred evaluation method.
Figure 3C:
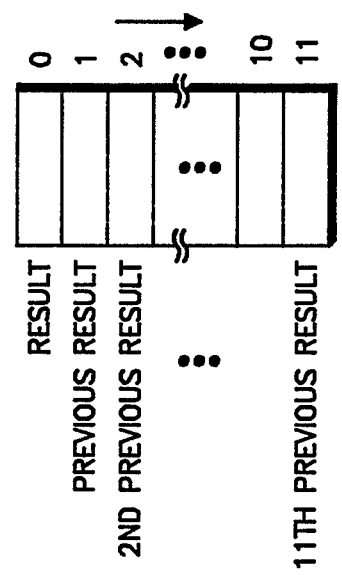
Figure 3B:
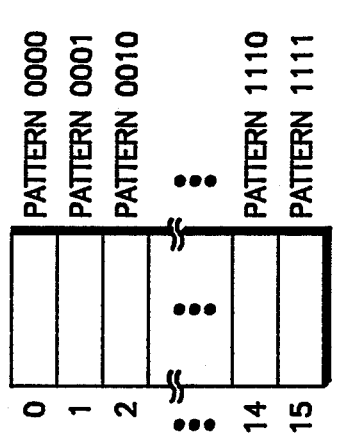

Referring now to FIGS. 3a and 3b, the preferred method of evaluating each segment of each received signal is shown. In FIG. 3a, a segment 202 of a received signal is parsed to form a plurality of sub-segments 300. Each sub-segment is m bits in length, where m is selected to be the length (in bits) of the digital patterns to be evaluated. In the preferred embodiment of the present invention, m is selected as four, thus providing 2048 (8192/4) segments 300 each 4 bits in length. It is known that with 4 bits, it is possible to distinguish 16 different states (i.e., 0000-1111). In FIG. 3b, 16 registers or memory locations (0-15) are reserved to tally each occurrence of each 4 bit pattern received in the segment 202. The segment 202 is investigated to determine which 4 bit pattern is represented by the first sub-segment 300. For example, if the first sub-segment contained "0010", register 3 (or functional equivalent) of FIG. 3b would be incremented by one to record the occurrence of the first sub-segment. In a similar manner, each remaining sub-segment is investigated to determine the occurrence of a bit pattern, and record the occurrence.

Each 4 bit pattern is modeled as a set of 4 Bernoulli trials. Sixteen possible states result, each of which have Binomially distributed occurrences. The probability P of any particular one occurring is 0.0625 (i.e., 1/16). Thus, from equation (1):

$$E(K) = N/16 \qquad (3)$$

Since the segment 202 was parsed into 2048 4-bit sub-segments (300), N=2048. Equation (3) then becomes:

$$E(K) = 2048/16 = 128 \qquad (4)$$

Thus, it is expected that the number of occurrences of any 4-bit pattern K will be 128 times in an uncorrupted encrypted signal. By comparing the actual pattern occurrences stored in the registers 0-15, the segment 202 by be evaluated to obtain a measure of the signal's quality. In the preferred embodiment of the present invention, each tally of pattern occurrences is subtracted from the expected occurrences. Thus:

$$(\text{Actual \# of pattern K}) - 128 \qquad (5)$$

Equation (5) is repeated for each pattern K, and the result stored in any convenient place, such as the registers 0-15 since after the calculation of equation (5), the number of occurrences is no longer required. The difference values (absolute value) are summed to form a composite result of the segment. This result is compared to predetermined threshold to determine whether to indicate (assert) the detect signal 107.

However, those skilled in the art will appreciate that even though the segment size is large, parsing the received signals potentially may disrupt the distribution. Thus, after analyzing a first segment, the received signal may appear to be the expected signal, while after analyzing a second segment, the received signal may appear not to be the expected signal. Overall, this random happenstance may have a low probability, however, the present invention prefers to eliminate its possibility of occurrence. Accordingly, as illustrated in FIG. 3c, the present invention stores a "history" of each statistical result of each segment for the received signal in a convenient storage means (such as RAM). Upon each subsequent calculation, the result is averaged with the previous results in the well known moving average operation. By maintaining a moving average of the results of each signal, the present invention eliminates the occurrence of a one segment determination that may cause the detector 100 to assert the detect signal, and then have to remove it.

Referring still to FIG. 3c, the last several results of each signal are stored to develop a "history table." Initially the first two results are added and divided by two. Next the last three results are summed and divided by three and so on. Preferably, however, the present invention limits the history table, and thus the moving average to a predetermined number of results. In the preferred embodiment of the present invention, the number of previous results retained for the moving average is twelve. Thus, registers 0-11 hold the current result and the previous eleven results in a First-In-First-Out (FIFO) arrangement. Accordingly, after the first twelve results, the moving average is calculated by:

$$\text{Ave.} = (\text{Sum of last 12 results})/12 \qquad (6)$$

As previously mentioned, any real implementation of an unmatched receiver will band-limit a noise signal and therefore alter the characteristic of received noise. It is possible for a receiver designer to "characterize" a receiver by observing the response of a pure noise signal applied at a receiver. In this way the determination of whether a particular receiver tends to produce more logical 1's than logical 0's (or vise versa) may be determined, and thus, the evaluation of whether a received signal is more like a noise signal or a Binomially distributed signal may be improved.

Figure 4:
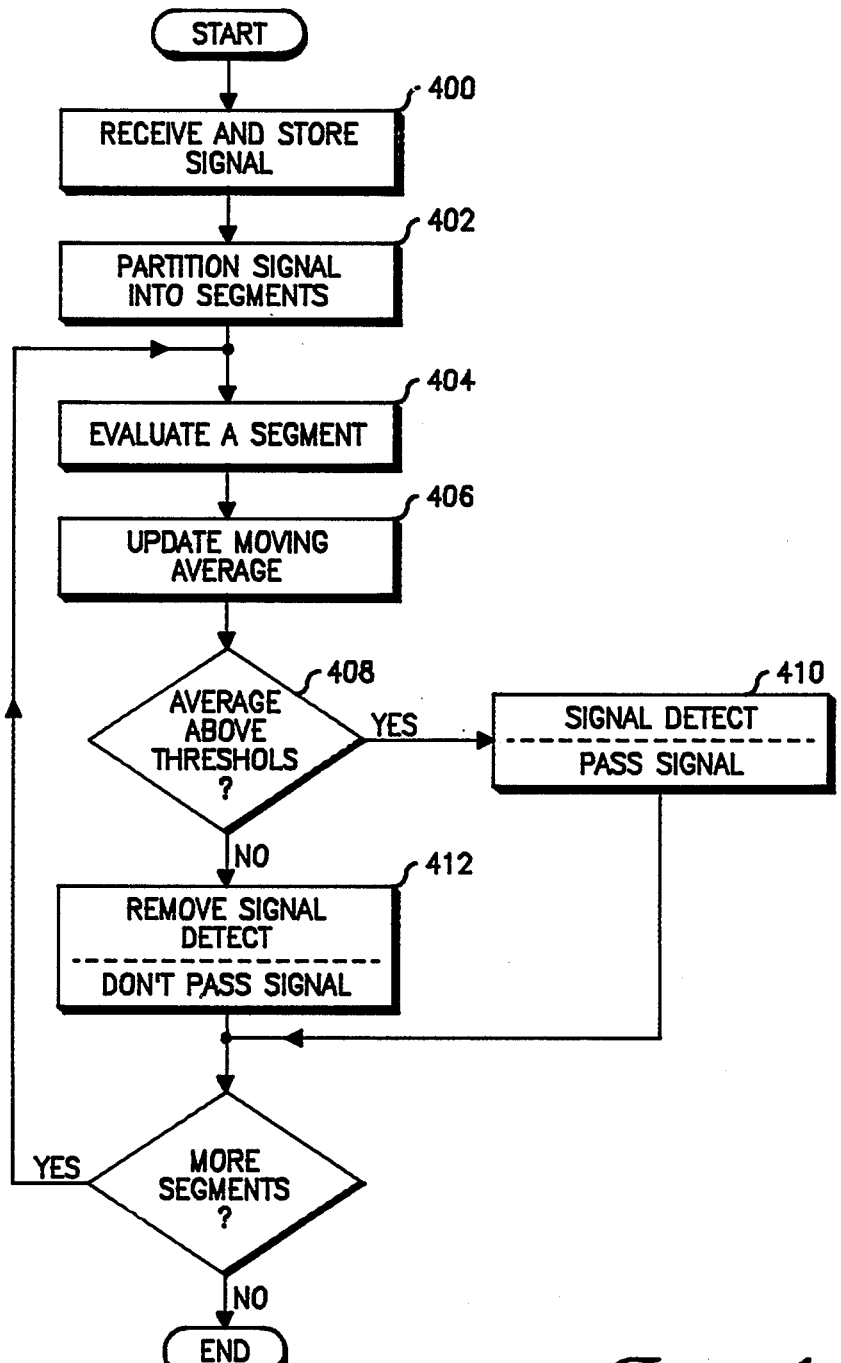
FIG. 4 is a flow diagram of the steps executed by the detector of FIGS. 1a or 1b.

Referring now to FIG. 4, there is shown a flow diagram of the steps executed by the detector 100 of FIGS. 1a and 1b. The routine begins in step 400, where the received signal is received and stored. Step 402 partitions the signals into M bit segments (8192 bits in the preferred embodiment) and transfers control to step 404, which statistically evaluates each of the plurality of segments (as described in conjunction with FIGS. 3a and 3b.) to determine whether each segment is close to a Binomially distributed signal (and therefore a desirable encrypted signal). Each of the results in step 404 are stored in a convenient storage means (such as RAM) that forms a moving average of the results (see FIG. 3c). Decision 408 determines whether the moving average is above or below the threshold selected based upon the Binomial distribution. If the determination of decision 408 is that the average is above the threshold, the routine proceeds to step 410, which asserts the detect signal 107. Conversely, if the determination of decision 408 is that the average (not an individual segment) is below the predetermined threshold, step 412 removes the detect indication. In any event, decision 414 is next determines if there are more segments to evaluate. If so, control is routed back to step 404. If not, the routine of FIG. 4 ends.

The present invention bases its decision upon the statistical comparison of a received signal to a known distribution. Although the above discussion has centered around the reception of a encrypted signal, whose probability density can be shown to be that of a Binomial distribution, any other identifiable distribution may be selected. Thus, it is known by those skilled in the art that a voice signal digitized in a Continuously Variable Slope Delta-Modulator (CVSD) has a characteristic waveform wherein a plurality of logical ones and a plurality of logical 0's tend to be grouped together. Therefore, the segments may be examined for a consecutive string of 1's and 0's. Those received signals that exhibit consecutive strings of ones and zeroes will tend to be closer to a high quality received signal than those that tend towards a more random distribution. Moreover, a received signal that employs a known repeating pattern, such as a synchronization pattern, may form a unique distribution such that superior quality signals may be distinguished from noisy signals.

While a particular embodiment of the invention has been described and shown, it should be understood that the invention is not limited thereto since many modifications may be made. In particular, any length may be used for the sub-segment 300 (including a length of one; i.e., bit-by-bit) so long as N remains sufficiently large. It is therefore contemplated to cover by the present application any and all such modifications that may fall within the true spirit and scope of the basic underlying principles disclosed and claimed herein.

What is claimed is:

1. A method for detecting a digital signal from a received signal to provide a detect signal, comprising the steps of:
    (a) storing the received signal to provide a stored signal;
    (b) parsing said stored signal to provide a plurality of segments;
    (c) parsing each of said segments into a plurality of sub-segments each having a predetermined length;
    (d) tallying the number of occurrences of each of a plurality of predetermined bit patterns defined by said predetermined length of said sub-segments;
    (e) computing the difference of each of said tallied occurrences to a predetermined expected value of occurrences to provide a plurality of differences;
    (f) summing said plurality of differences to provide a quality signal;
    (g) comparing said quality signal to a predetermined threshold;
    (h) providing the detect signal in response to step (g).

2. A method for detecting a digital signal from a received signal to provide a detect signal, comprising the steps of:
    (a) storing the received signal to provide a stored signal;
    (b) parsing said stored signal into segments having a predetermined length;
    (c) parsing each of said segments into a plurality of sub-segments having a predetermined length;
    (d) tallying the number of occurrences of each of a plurality of predetermined bit patterns defined by said predetermined length of said sub-segments;
    (e) computing the difference of each of said tallied occurrences to a predetermined expected value of occurrences to provide a plurality of differences;
    (f) summing said plurality of differences to provide a quality signal;
    (g) averaging said quality signal with previous quality signals to provide an averaged quality signal;
    (h) comparing said averaged quality signal to a predetermined threshold to provide the detect signal;
    (i) repeating steps (d) through (h) until all of said segments of said stored signal are evaluated.

3. An apparatus for detecting a digital signal from a received signal to provide a detect signal, comprising:
    means for storing the received signal to provide a stored signal;
    means for parsing said stored signal into segments having a predetermined length;
    means for parsing a segment into a plurality of sub-segments having a predetermined length;
    means for tallying the number of occurrences of each of a plurality of predetermined bit patterns defined by said predetermined length of said sub-segments;
    means for computing the difference of each of said tallied occurrences to a predetermined expected value of occurrences to provide a plurality of differences; and
    means for summing said plurality of differences to provide a quality signal;
    means for comparing said quality signal to a predetermined threshold to provide a detect signal.

4. An apparatus for detecting a digital signal from a received signal, comprising:
    means for storing the received signal to provide a stored signal;
    means for parsing said stored signal into segments having a predetermined length;
    means for parsing a segment into a plurality of sub-segments having a predetermined length;
    means for tallying the number of occurrences of each of a plurality of predetermined bit patterns defined by said predetermined length of said sub-segments;

means for computing the difference of each of said tallied occurrences to a predetermined expected value of occurrences to provide a plurality of differences; and means for summing said plurality of differences to provide a quality signal;

means for averaging said quality signal with previous quality signals to provide an averaged quality signal;

means for comparing said averaged quality signal to a predetermined threshold to provide a detect signal.

5. In a secure communication system, a method for detecting an encrypted signal from a received signal and for providing a decrypted information signal, comprising the steps of:

(a) storing the received signal to provide a stored signal;

(b) parsing said stored signal into segments having a predetermined length;

(c) parsing each of said segments into a plurality of sub-segments having a predetermined length;

(d) tallying the number of occurrences of each of a plurality of predetermined bit patterns defined by said predetermined length of said sub-segments;

(e) computing the difference of each of said tallied occurrences to a predetermined expected value of occurrences to provide a plurality of differences;

(f) summing said plurality of differences to provide a quality signal;

(g) comparing said quality signal to a predetermined threshold to provide a signal representing the detection of an encrypted signal;

(h) operating, in response to step (g), upon said received signal to provide the decrypted information signal.

6. A receiver for use in a secure communication system, said receiver having means for detecting an encrypted signal from a received signal, and mean for decrypting said encrypted signal to recover an information signal, comprising:

means for storing the received signal to provide a stored signal;

means for parsing said stored signal into segments having a predetermined length;

means for parsing a segment into a plurality of sub-segments having a predetermined length;

means for tallying the number of occurrences of each of a plurality of predetermined bit patterns defined by said predetermined length of said sub-segments;

means for computing the difference of each of said tallied occurrences to a predetermined expected value of occurrences to provide a plurality of differences;

means for summing said plurality of differences to provide a quality signal;

means for comparing said quality signal to a predetermined threshold to provide a signal representing the detection of an encrypted signal; and means for operating upon said received signal to decrypt said encrypted signal to recover said information signal.

* * * * *